(12) United States Patent
Scott

(10) Patent No.: US 7,083,142 B2
(45) Date of Patent: Aug. 1, 2006

(54) COMPACT CO-AXIAL ROTOR SYSTEM FOR A ROTARY WING AIRCRAFT AND A CONTROL SYSTEM THEREOF

(75) Inventor: Mark Winfield Scott, Bethany, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 27 days.

(21) Appl. No.: 10/830,160

(22) Filed: Apr. 21, 2004

(65) Prior Publication Data

US 2005/0236518 A1   Oct. 27, 2005

(51) Int. Cl.
*B64C 11/34* (2006.01)

(52) U.S. Cl. .................. 244/17.13; 244/17.23; 416/128; 416/33

(58) Field of Classification Search .......... 244/17.13, 244/17.19, 17.23, 17.25; 416/1, 24, 124, 416/128, 129, 33, 34
See application file for complete search history.

(56) References Cited

U.S. PATENT DOCUMENTS

| | | | |
|---|---|---|---|
| 3,521,971 A * | 7/1970 | Cheney, Jr. ................... 416/1 |
| 4,008,979 A | 2/1977 | Cooper et al. |
| 4,027,999 A * | 6/1977 | Durno ......................... 416/40 |
| 4,047,838 A | 9/1977 | Ferris et al. |
| 5,156,527 A | 10/1992 | Pancotti |
| 5,165,853 A | 11/1992 | Pancotti |
| 5,620,305 A | 4/1997 | McArdle |
| 6,050,778 A | 4/2000 | McArdle et al. |
| 6,311,924 B1 * | 11/2001 | Ferrer ........................ 244/17.13 |
| 2005/0067527 A1 * | 3/2005 | Peterson ...................... 244/17.11 |

* cited by examiner

*Primary Examiner*—Peter M. Poon
*Assistant Examiner*—Timothy D. Collins
(74) *Attorney, Agent, or Firm*—Carlson, Gaskey & Olds (57) ABSTRACT

A dual, counter rotating, coaxial rotor system provides an upper and lower rotor system, with a reduced axial rotor separation distance along a common axis by way of rotor tip position sensing and rotor position controls to avoid tip contact.

11 Claims, 10 Drawing Sheets

COMPACT CO-AXIAL ROTOR SYSTEM FOR A ROTARY WING AIRCRAFT AND A CONTROL SYSTEM THEREOF

BACKGROUND OF THE INVENTION

The present invention relates to a coaxial rotor system, and more particularly to a coaxial rotor system with closely spaced articulated rotors.

Future military forces require enhanced vertical lift capabilities in a compact package. The CH-53E is currently the world's largest shipboard compatible helicopter. A significant consideration in the design of the CH-53E was shipboard compatibility. The CH-53E effectively defines the maximum aircraft spatial capacity which will fit on the elevators and in the hangar deck of United States Marine Corps Amphibious Assault Ships, more commonly called an LHA or LHD. Emerging payload weight requirements are beyond the growth capabilities of the CH-53E while maintaining current shipboard compatibility requirements. Thus, a conventional helicopter configuration like the CH-53E would be too large to fit in the hangar deck or on the elevator of an LHA or LHD.

Conventional coaxial rotor systems are exceeding efficient as lift generating mechanism for a heavy lift VTOL aircraft. There are no power losses to an anti torque device and rotor efficiency is somewhat improved relative to a single rotor due to swirl recovery. The aircraft also has a much lower foot print due to the lack of a tail rotor and supporting boom structure. Disadvantageously, conventional dual counter rotating coaxial rotor systems require a relatively large separation between the rotor systems. This drives the height of a coaxial rotor aircraft to be taller than that of a single rotor aircraft.

Typically the rotor or disks of a conventional dual counter rotating coaxial rotor system are axially spaced a distance of approximately 10 percent of the rotor diameter. Such a separation is required to provide adequate space for differential rotor blade flapping and bending to assure clearance therebetween regardless of aircraft maneuver. The blade tip position of a conventional coaxial rotor system is determined by the natural equilibrium of aerodynamic and inertial forces acting on the blade. Since the rotors are counter rotating, many maneuvers cause mirror image, or differential, rotor tilt, which reduces tips separation at some point in the rotation. It has been found from decades of industry experience that a hub separation distance of 10% of rotor diameter is adequate for most transport types of aircraft. Disadvantageously, application of such rotor spacing to a heavy lift VTOL aircraft which are capable of emerging vertical lift requirements result in an aircraft which will likely not meet current shipboard height compatibility restrictions.

Accordingly, it is desirable to provide an affordable heavy lift VTOL aircraft with low to moderate risk technologies while being compatible with current shipboard restrictions.

SUMMARY OF THE INVENTION

The invention described herein utilizes rotor position control through a variety of methods singularly, or in any combination determined to be most advantageous, to reduce the separation between coaxial rotors and hence reduce the overall height of the aircraft such that the aircraft fits within the hangar deck of an amphibious assault ship.

The dual, counter rotating, coaxial rotor system according to the present invention provides an upper and lower rotor system which are separated by an axial rotor separation distance of approximately 7.5% or less of the rotor system diameter along a common axis. The 7.5 percent separation distance is a reduction of approximately 25 percent over conventional coaxial rotor systems which are typically separated by at least 10 percent.

The rotor system requires a blade tip separation clearance between the rotor flapping ranges to assure that the rotor blade tips will not contact. As found from decades of industry experience with conventional coaxial rotor systems the minimum tip separation clearance in any maneuver is approximately 3 percent of the rotor system diameter or approximately 35 percent of the axial distance between the rotor systems.

The present invention determines the relative position of the blades of each rotor system and independently controls each rotor and or blade such that blade flapping and blade elastic bending are significantly reduced, hence enabling reduced rotor separation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
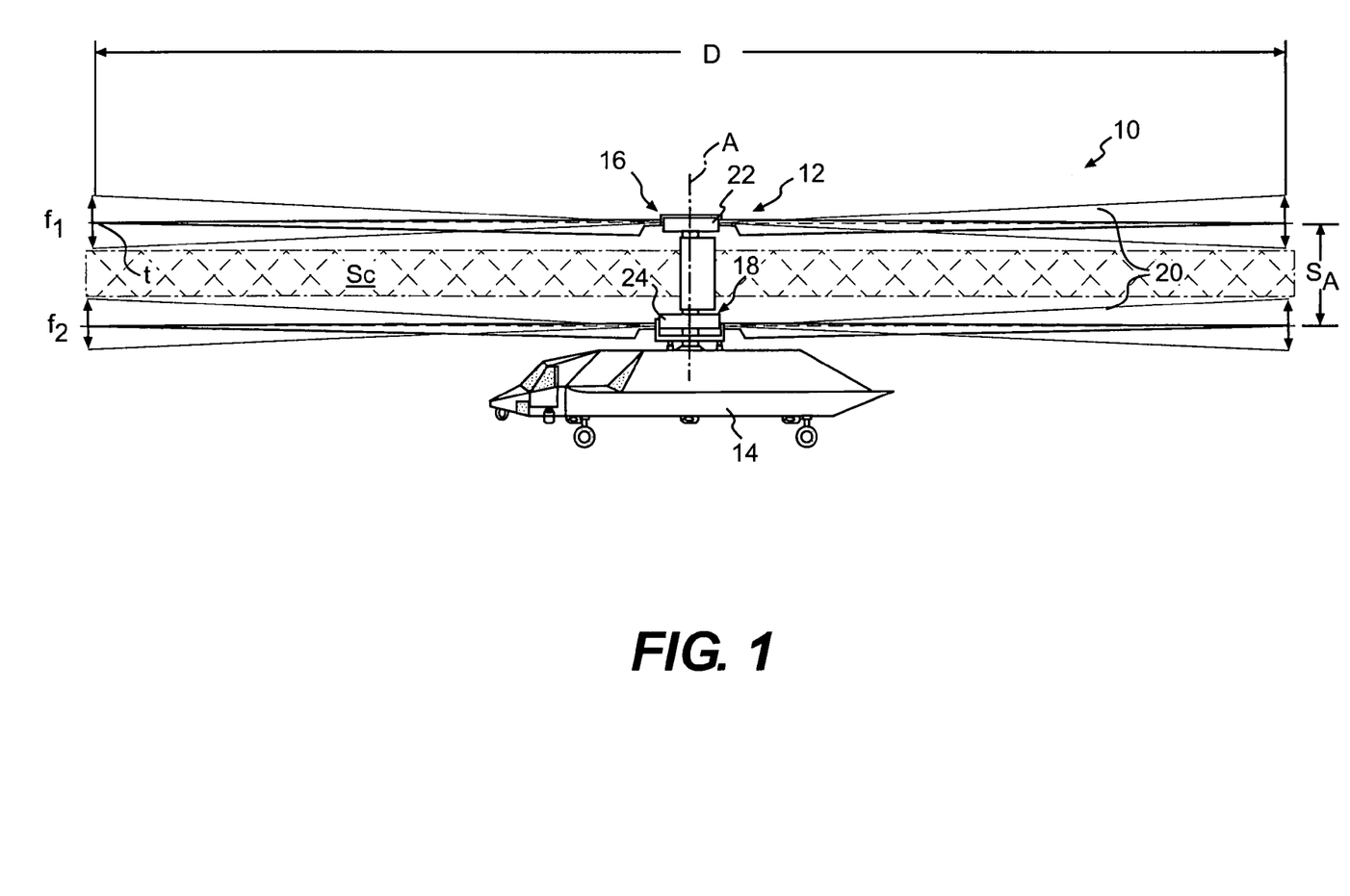
FIG. 1 is a general schematic view of an exemplary coaxial rotary wing aircraft embodiment for use with the present invention.

FIG. 1 schematically illustrates a rotary-wing aircraft 10 having a dual, counter rotating, coaxial rotor system 12. The aircraft 10 includes an airframe 14 which supports the dual, counter rotating, coaxial rotor system 12 along a common axis A. Although a particular helicopter configuration is illustrated in the disclosed embodiment, other coaxial propulsor systems which require closely spaced rotors or propellers in helicopter, airplane and/or tilt rotor type aircraft will also benefit from the present invention.

The rotor system 12 includes an upper rotor system 16 and a lower rotor system 18 which rotate about the common axis A. Each rotor system 16, 18 include a multiple of rotor blades 20 mounted to a rotor hub 22, 24.

Figure 2:
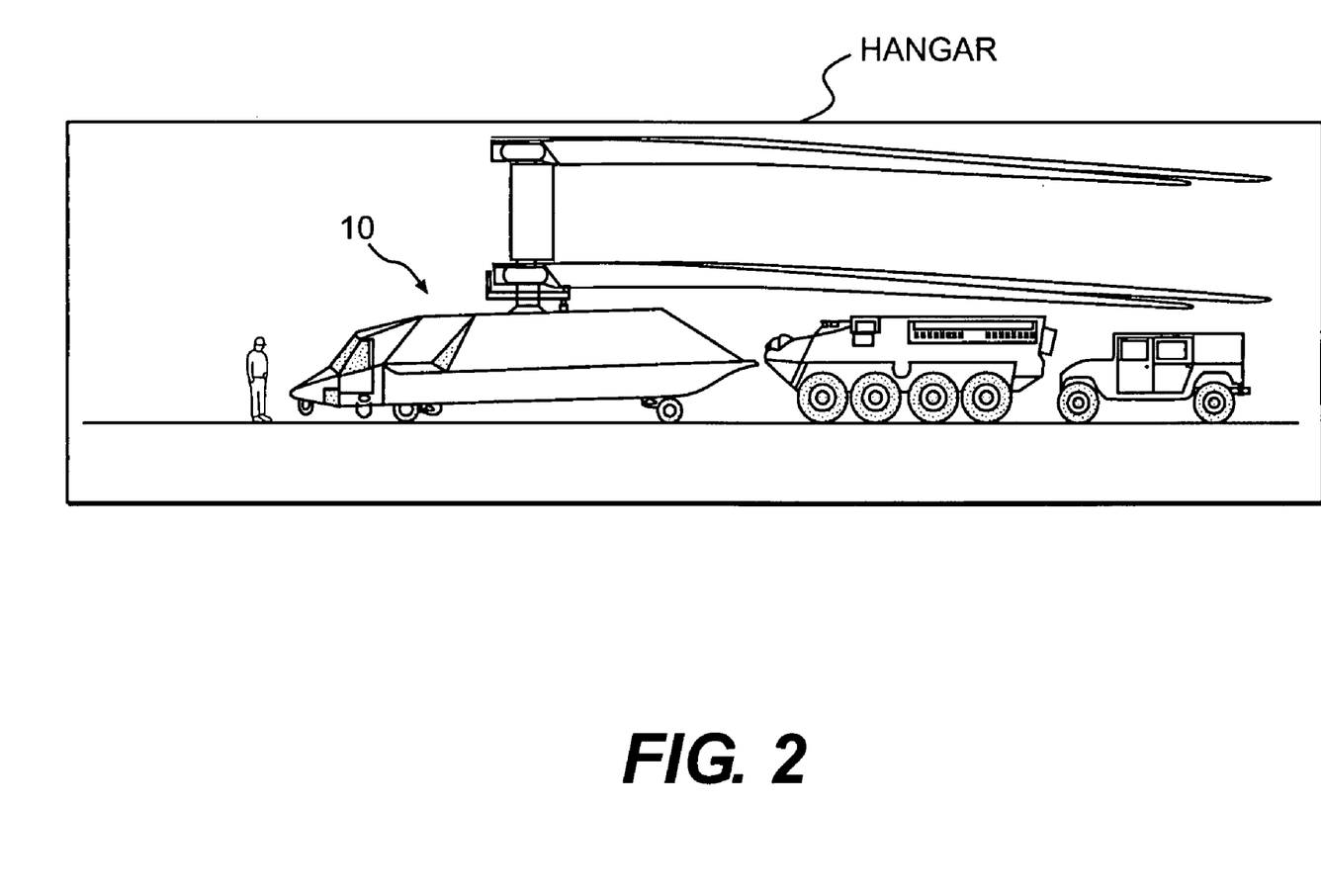
FIG. 2 is a general schematic view of an exemplary coaxial rotary wing aircraft in a shipboard stored position.

The rotor systems 16, 18 are separated by an axial rotor separation distance Sa of less than 10 percent of the rotor system diameter D along common axis A. Preferably, the rotor systems 16, 18 are separated by an axial distance of approximately 7.5 percent or less of the rotor system diameter D along common axis A. The 7.5 percent separation distance is a reduction of approximately 25 percent over conventional coaxial rotor systems which are typically separated by at least 10 percent. Such a separation distance Sa provides a coaxial configuration which is relatively compact to fit within a conventional LHA and LHD hanger deck while permitting other storage under the folded rotor blades (FIG. 2).

Figure 3:
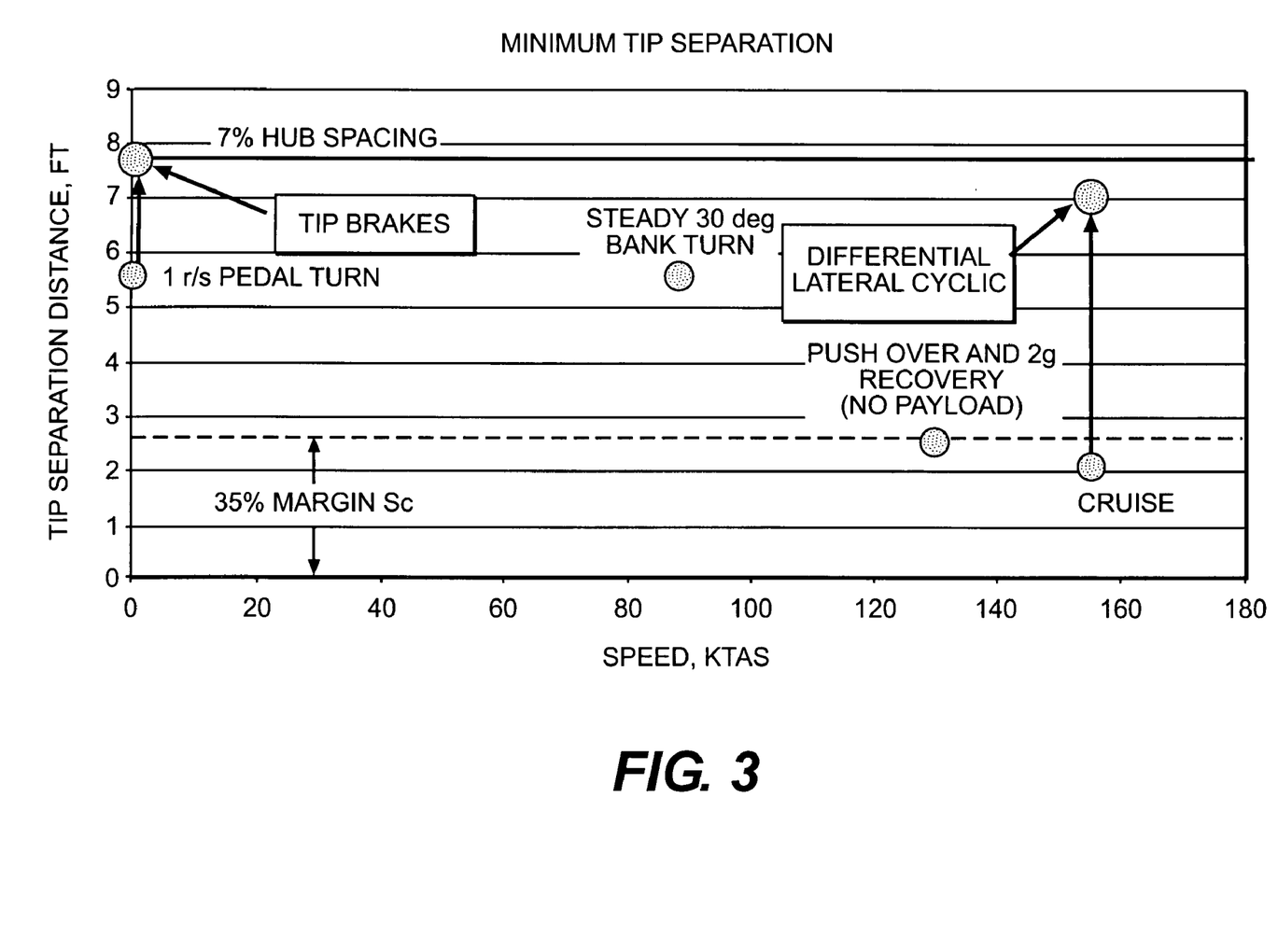
FIG. 3 is graphical representation of a tip separation between rotor systems of a coaxial rotor system in response to various maneuvers.

During various maneuvers, the rotor blade tips t of the rotor blades 20 will move through a flapping and bending range (defined schematically by arrows f1, f2 in FIG. 1 and by a maneuver chart in FIG. 3). The rotor systems 16,18 requires a rotor blade tip separation clearance Sc between the flapping range f1, f2 to assure that the rotor blade tips t will not contact. The separation clearance Sc is preferably 3 percent of the rotor system diameter D or approximately 35 percent of the axial distance Sa between the rotor systems 16,18. It should be understood that other clearances will benefit from the present invention; however, the 35 percent separation clearance has proved to be a relatively consistent effective separation value as practiced by numerous coaxial rotor system designs.

Referring to FIG. 3, a chart represents rotor tip separation distances in response to various maneuvers. Applicant has determined that a coaxial rotor system with, for example, a 111 foot diameter rotor systems 16, 18 separated by only a 7% hub spacing results in rotor tip separation convergence which may fall below the separation clearance Sc (defined by the dotted line) when utilizing conventional rotor control systems. The rotor control systems cited below according to the present invention permit a 7% hub spacing while maintaining the 35% separation clearance Sc.

Figure 4:
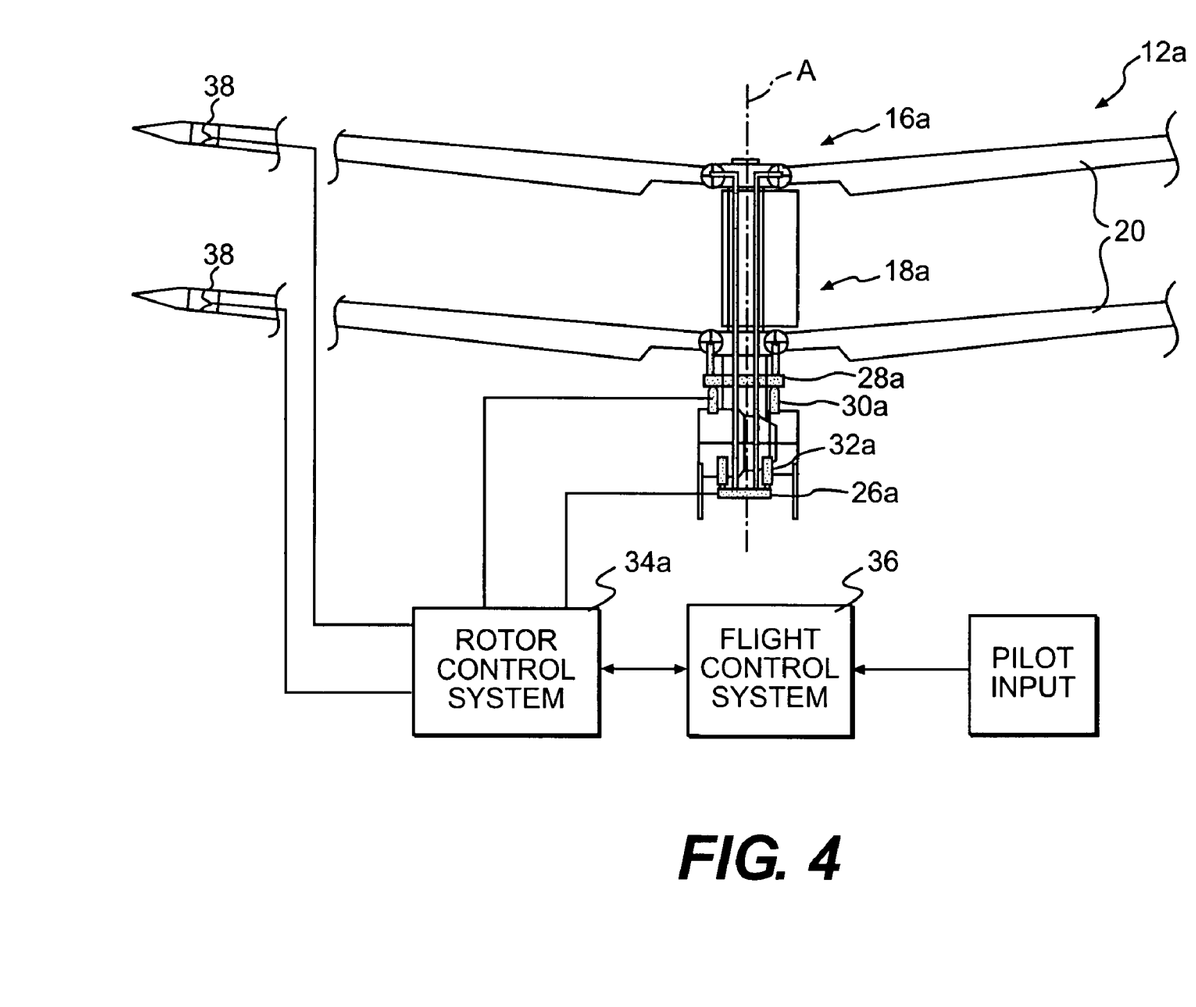
FIG. 4 is a block diagram of one embodiment of a rotor control system according to the present invention.

Referring to FIG. 4, each rotor system 16a, 18a is independently controlled through a separate swashplate assembly 26a, 28a which selectively articulates each rotor system 16a, 18a. Generally, motion of the swash plate assembly 26a, 28a along the rotor axis A will cause the rotor blades 20 of the respective rotor system 16a, 18a to vary pitch collectively and tilting of the swash plate assembly 26a, 28a with respect to the axis A will cause the rotor blades 20 to vary pitch cyclically and tilt the rotor disk. The swash plate assemblies 26a, 28a translate and/or tilt by a separate servo mechanism 30a, 32a which selectively articulates each rotor system 16, 18 independently in both cyclic and collective in response to a rotor control system 34a (illustrated schematically). The rotor control system 34a communicates with a flight control system 36 which receive pilot inputs from controls such as a collective stick, cyclic stick, foot pedals and the like. A sensor suite 38 measures the relative position of the blades 20 on each rotor system 16, 18 such that the control system 34 determines the relative rotor blade 20 separation. The following paragraphs describe the rotor control methods used to minimize rotor flapping and bending and are applicable to blades controlled by the actuation methods listed above.

Figure 5:
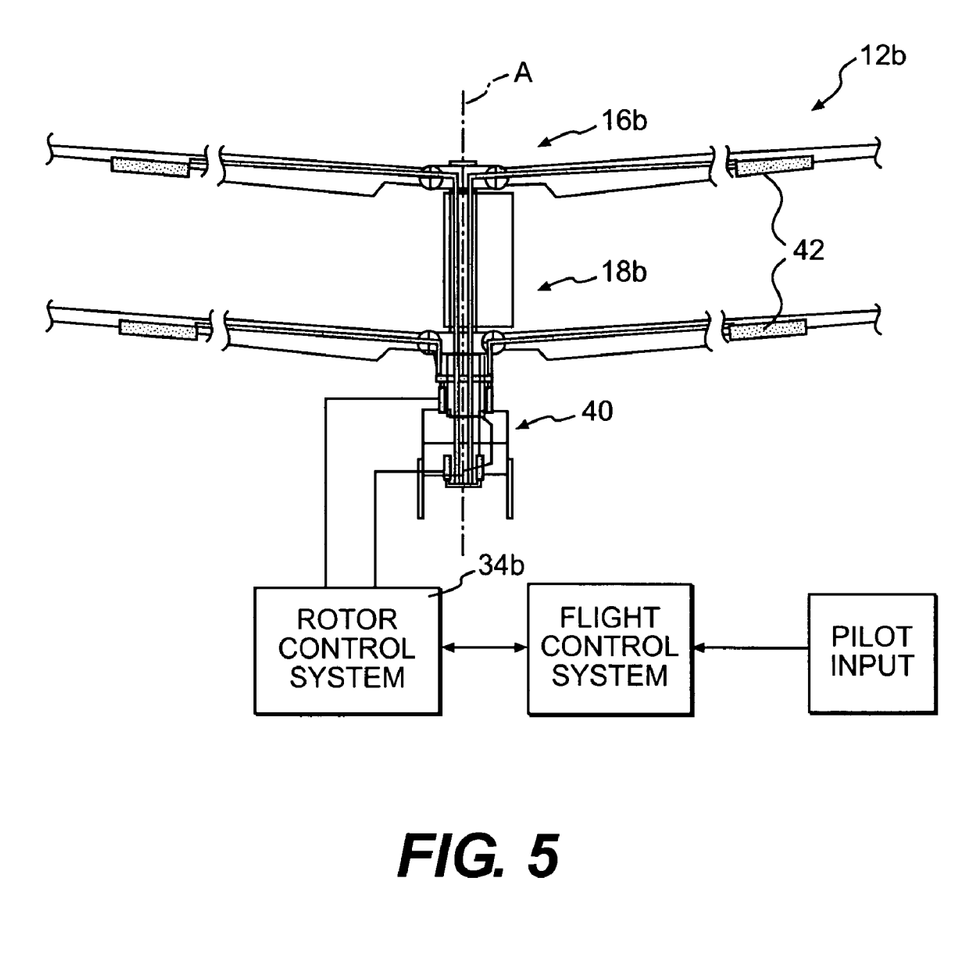
FIG. 5 is a block diagram of a servo-flap embodiment of a rotor control system according to the present invention.

Referring to FIG. 5, a rotor control system 34b includes a servo flap controlled rotor system 12b. The servo flap control system is a proven rotor control system in which a rotor blade position is achieved through a rotor blade mounted member. Each blade of rotor systems 16b, 18b includes a partial radius servo flap 42 of a servo flap system 40 through, for example only, a series of pushrods and bell cranks that run to relatively small swash plates in the aircraft. It should be understood that various actuators and trailing and leading edge slat mounting arrangements will benefit from the present invention. Actuators such as mechanical, electrical, pneumatic, piezoceramic, piezoelectric, hydraulic and the like, both within the blade and external thereto, will also benefit from the present invention.

Figure 6:
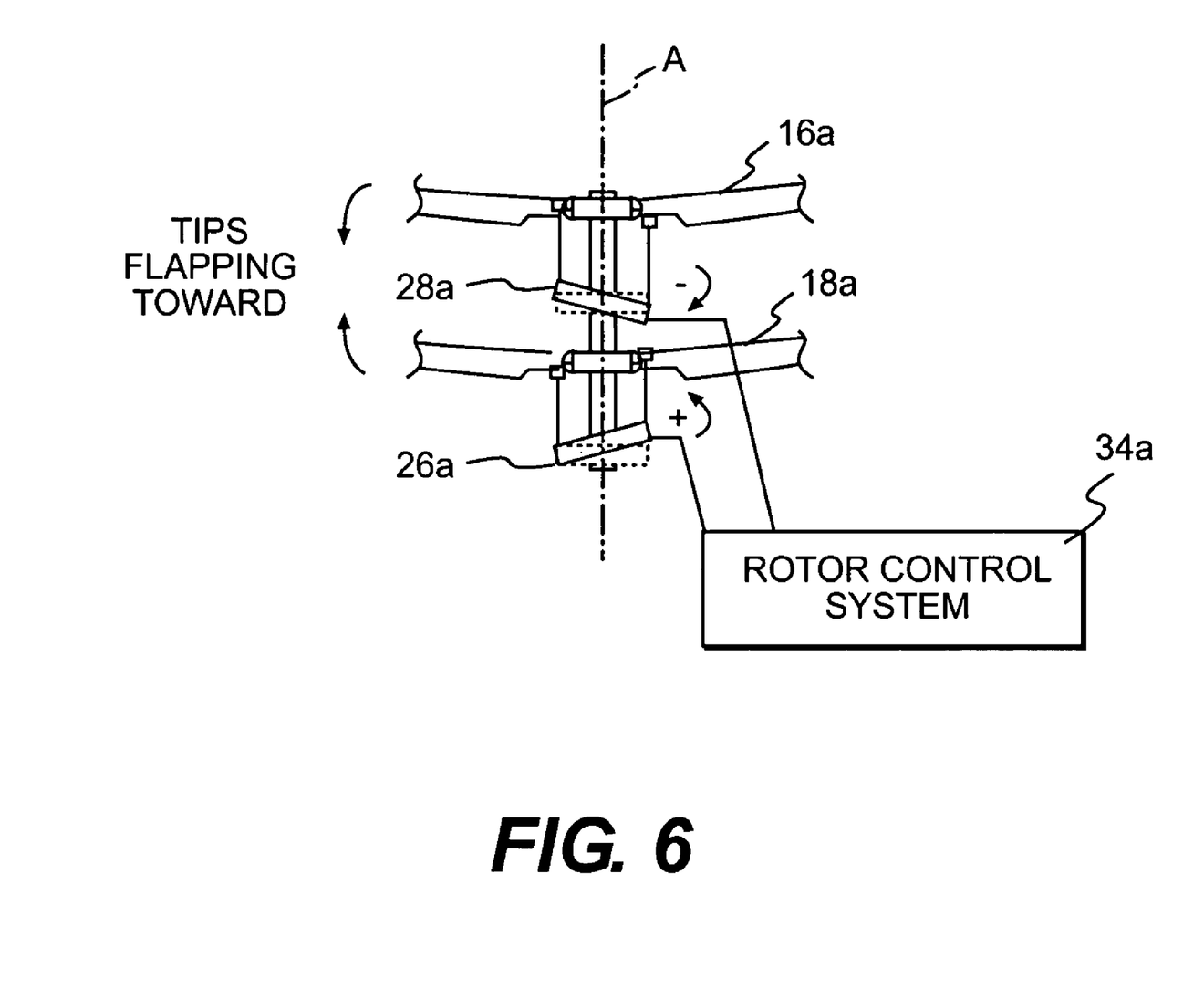
FIG. 6 is a block diagram of the rotor control system of FIG. 4 illustrating differential swash plate movement.

Referring to FIG. 6, a rotor control system 34a independently controls each swash plate assembly 26a, 28a, which selectively controls each rotor system 16a, 18a. That is, the swash plate assembly 26a, 28a are not mechanically linked together and are articulated separately through independent servo mechanisms 30a, 32a which communicates with the rotor control system 34a through a remote communication system such as a fly-by-wire and/or fly-by-light system. The control system 34a determines the relative position of the blades 20 on each rotor system 16a, 18b and independently controls each swash plate assembly 26a, 28a to reduce the differential flapping between the rotor systems 16a, 18a. In other words, if the rotor blade tips of one rotor system 16a are approaching the rotor blade tips of the other rotor system 18a, the swash plates 26a, 26b are moved differentially to perform the same maneuver while increasing separation between the rotor blade tips. For example, in forward flight or cruise the rotor blade tips will tend toward each other on one lateral side of the rotor systems 16a, 18a (FIG. 3). By articulating lateral differential cyclic in which swash plate 26a is moved to a relative positive position from the original position while swash plate 26b is moved to relatively negative position from the original position, the differential swash plate positions are effectively canceled, forward cyclic is unaffected, and the separation between the rotor blade tips is increased (also illustrated by cruise maneuver point in FIG. 3).

The control system 34b preferably controls the servo flap system 40 in a higher harmonic control (HHC) methodology. That is, each servo flap 42 on each blade 20 of each rotor system 16b, 18b (FIG. 7) is pitched independently and at a rate greater than once per rotor revolution. This enables blade lift corrections as the blade travels around the azimuth. HIC includes the acquiring sensor data in real time and as a result of this data, each blade is controlled to provide the desired separation clearance Sc through defined algorithms. In addition the separation clearance Sc may be tailored to multiple performance objectives and different modes of operation, e.g. a high performance mode, a low noise mode, etc., and for different flight conditions and/or configurations, e.g., hover, forward flight, air-to-air engagement, etc. Implementation of HHC may additionally or alternatively include active control and/or prescribed motion functions in response to base conditions, e.g., forward flight, hover, etc.

Figure 7:
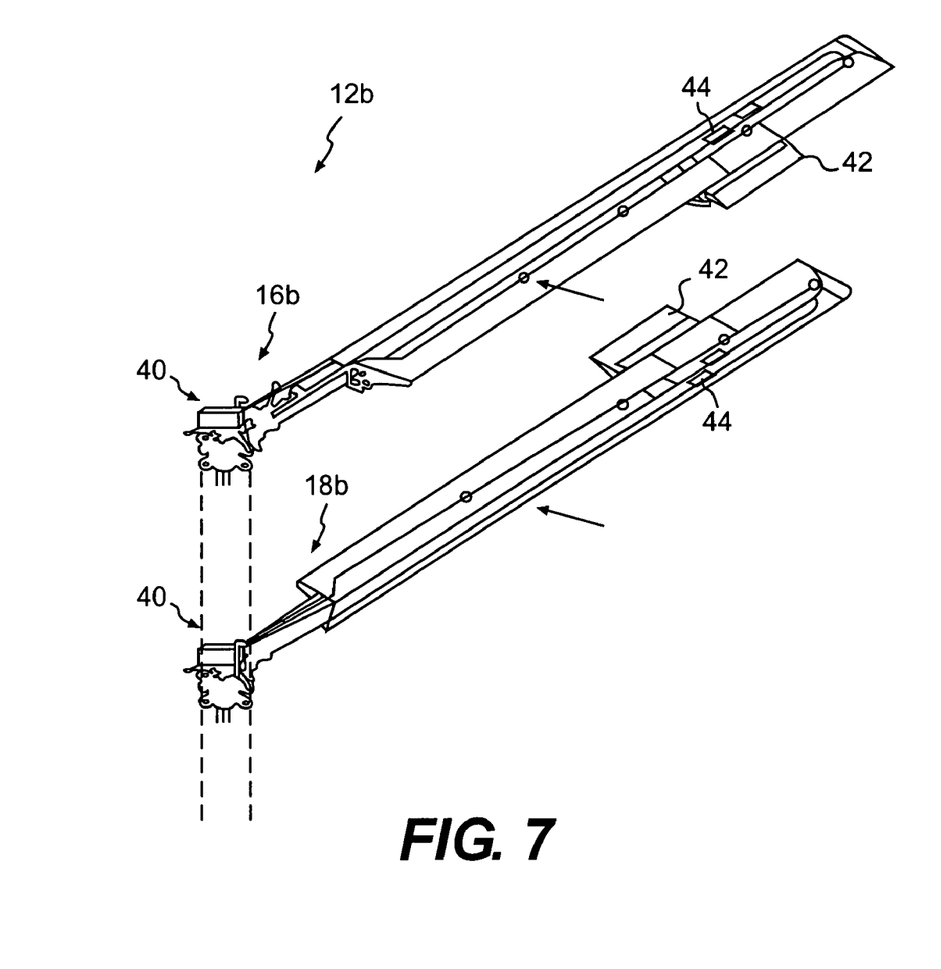
FIG. 7 is a block diagram of a swash plateless servo-flap embodiment of a rotor control system according to the present invention.
Figure 8:
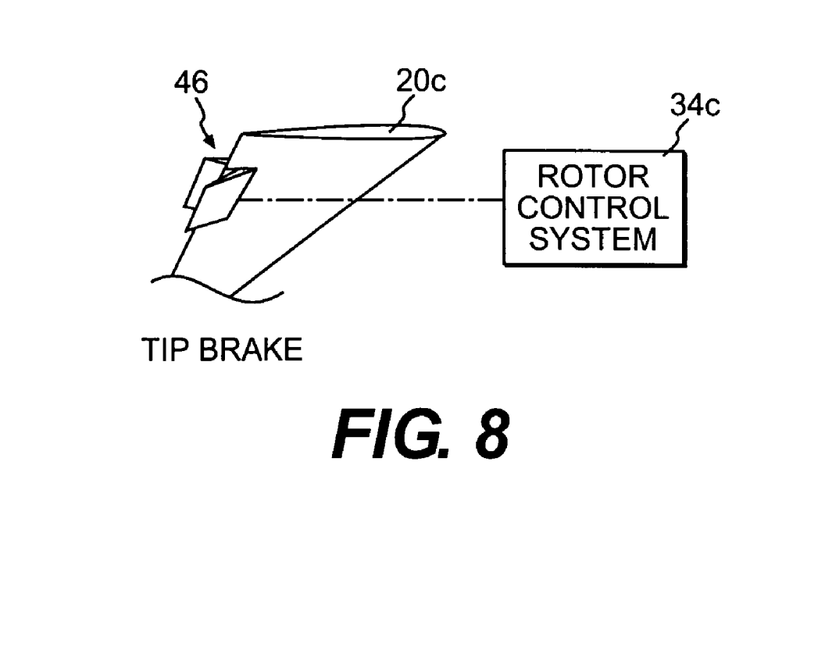
FIG. 8 is a block diagram of a tip brake embodiment of a rotor control system according to the present invention.

Referring to FIG. 8, another rotor control system 34c controls a tip brake 46 on each rotor blade 20c of each rotor system 16c, 18c (only one illustrated). The tip brakes 46 are preferably split flaps, which may be in addition to or integrated with servo flaps 42 (FIG. 7). That is, the servo flaps may be split flaps which also operate as tip brakes. Tip brakes are deployed on one rotor and create an unbalanced torque between the rotors. The unbalanced torque rotates, or yaws, the aircraft fuselage. The advantage of tip brakes is the zero change in blade lift, and hence no flapping response. Each tip brake 46 is operated in response to the control system 34c to reduce the differential flapping between the rotor systems 16c, 18c to maintaining the desired separation clearance Sc (illustrated by pedal yaw turn maneuver point in FIG. 3).

Figure 9:
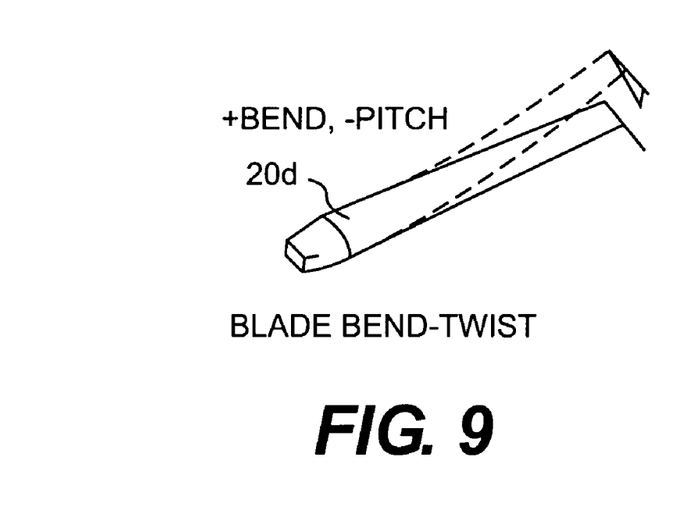
FIG. 9 is a schematic view of a composite rotor blade embodiment of a blade bending control system according to the present invention.

Referring to FIG. 9, another rotor control system is structurally integrated within each rotor blade 20d by coupling the bend and twist deflections of the rotor blade through composite design and manufacturing processes generally understood.

Figure 10:
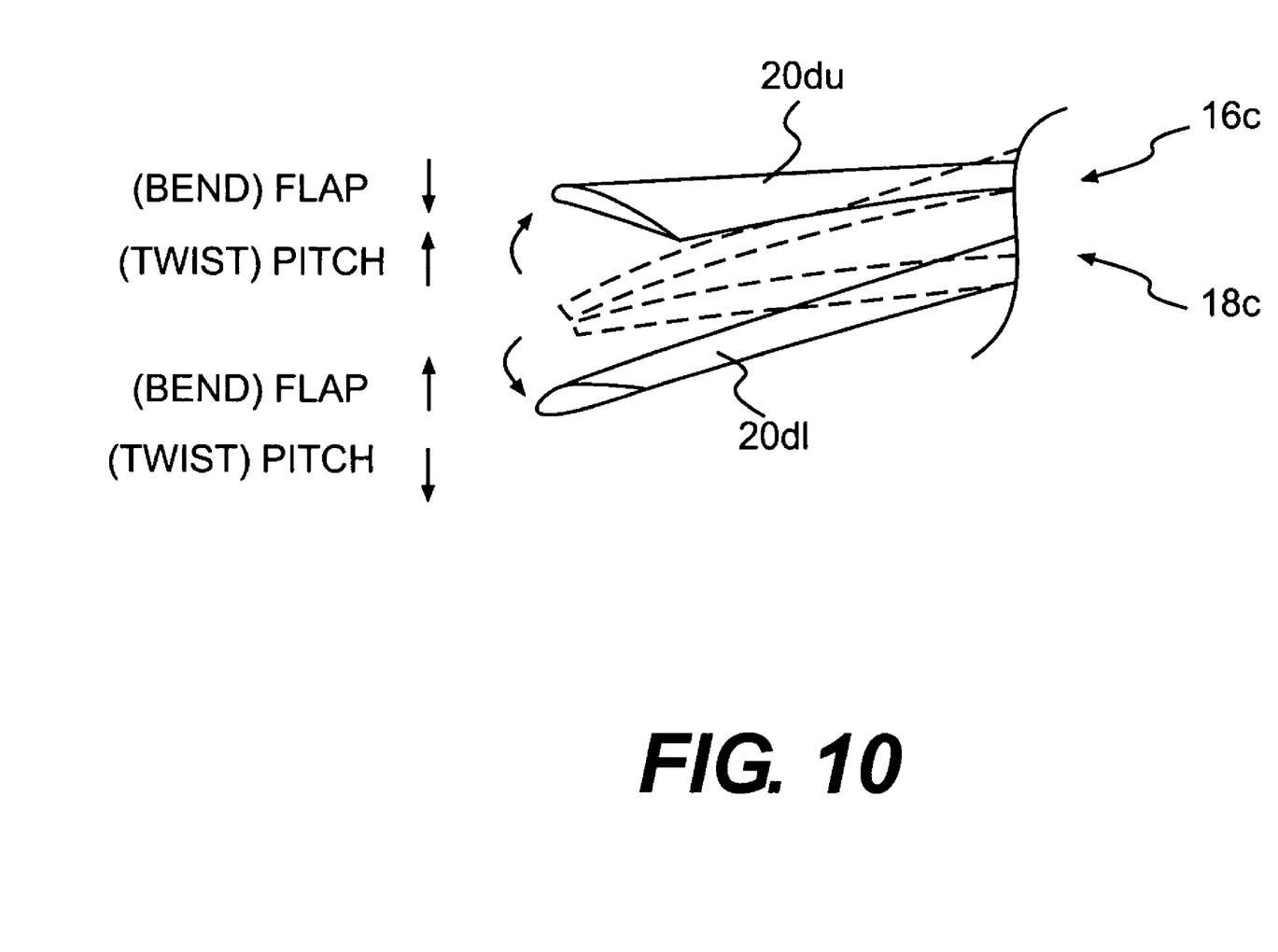
FIG. 10 is a schematic view of a bend-twist response of a composite rotor blade embodiment of FIG. 9.

Referring to FIG. 10, preferably, the rotor blades 20du of the upper rotor system 16c are designed to increase pitch and hence increase blade lift when bending downward toward the lower rotor system 18c while the rotor blades 20dl of the lower rotor system 18c are designed to decrease pitch and hence reduce lift when bending upward toward the upper rotor system 16c. The coupling in bending and twisting forces the blades 20du, 20dl to maintain the desired separation clearance Sc. In other words, the blades 20du, 20dl will flap away from each other in response to a maneuver which causes the blades 20du, 20dl to bend toward each other.

Figure 11:
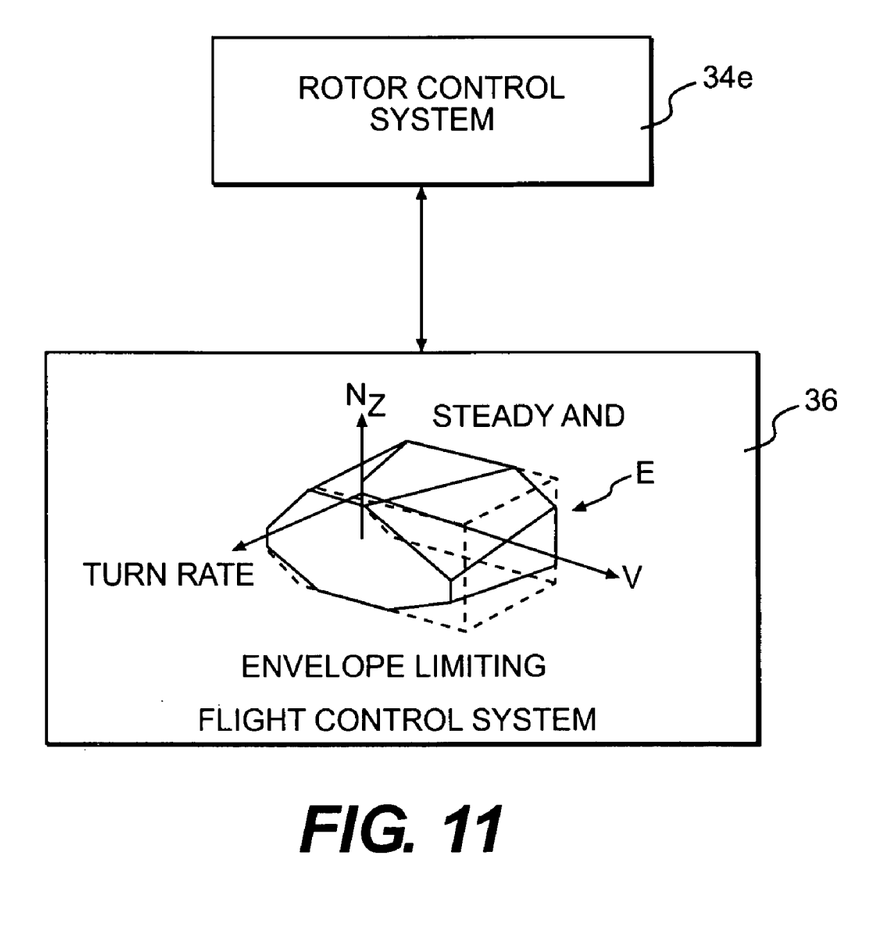
FIG. 11 is a schematic view of a flight control envelope embodiment of a rotor control system according to the present invention.

Referring to FIG. 11, another rotor control system 34e communicates with the flight control system 36 to selectively restrict portions of the rectangular flight envelope E. That is, certain control inputs, which will result in undesirable maneuvers within the flight envelope E, are prevented from occurring so as to maintain the desired separation clearance Sc. FIG. 11 shows typical flight envelope paramewrs; load factor (Nz, measured in g's), airspeed (V. measured in kts), and turn rate (measured in deg/sec). In general maneuvers that may cause excessive blade bending and flapping are located at the extreme corners of the envelope. A fly-by-wire (FBW) system enables advanced control laws where each rotor is controlled independently and will not accept pilot inputs that could place the coaxial rotor system into a flight state that may cause the rotor systems to converge and possibly contact. The resulting allowable flight envelope is shown as the truncated rectangular volume in FIG. 11. Other envelopes including longitudinal and rotational rates and accelerations in each axis can be superimposed to further restrict the aircraft operating envelope to ensure rotor tip clearance Sc. Moreover, FBW and/or HHC application to co-axial rotor systems permit the reduction or elimination of the rail as well as reduce rotor separation.

Although the rotor control systems disclosed herein are discussed individually, any rotor control system may be utilized with any other or a multiple of other rotor control systems disclosed herein or otherwise known. It should be understood that one rotor control system may be preferred in one area or maneuver in the flight envelope while another rotor control system may be preferred for another area or maneuver in the flight envelope. Preferably, a combination of rotor control systems are utilized to assure desired separation clearance Sc throughout the entire flight envelope.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of controlling a coaxial rotor system comprising the steps of:
    (1) locating a first rotor system and a second rotor system along a common axis, the second rotor system spaced an axial distance from the first rotor system; and
    (2) independently controlling the first rotor system and the second rotor system with regard to pitch to maintain a minimum rotor blade tip separation between a rotor blade tip of the first rotor system and a rotor blade tip of the second rotor system.

2. A method as recited in claim 1, wherein said step (2) further comprising the step of:
    independently controlling the first rotor system and the second rotor system through one or more rotor blade mounted control surfaces located on each rotor blade of the first rotor system and the second rotor system.

3. A method as recited in claim 2, further comprising the step of:
    independently pitching each of a multiple of rotor blades of the first rotor system a multiple of times during each rotation of the first rotor system through a higher harmonic control system; and
    independently pitching each of a multiple of rotor blades of the second rotor system a multiple of times during each rotation of the second rotor system through the higher harmonic control system.

4. A method as recited in claim 2, further comprising the step of:
    actuating a tip brake on at least one of a multiple of rotor blades of the first rotor system to maintain the minimum rotor separation between the first rotor system and the second rotor system.

5. A method as recited in claim 1, wherein said step (2) further comprising the step of:
    independently controlling the first rotor system and the second rotor system through a respective first pitch control assembly and second pitch control assembly located remotely from the first rotor system and the second rotor system.

6. A method as recited in claim 5, further comprising the step of:
    independently pitching each of a multiple of rotor blades of the first rotor system a multiple of times during each rotation of the first rotor system through a higher harmonic control system; and
    independently pitching each of a multiple of rotor blades of the second rotor system a multiple of times during each rotation of the second rotor system through the higher harmonic control system.

7. A method as recited in claim 1, wherein said step (2) further comprising the step of:
    limiting a flight envelope to maintain the minimum rotor separation.

8. A method as recited in claim 1, wherein said step (2) further comprising the step of:
    coupling a rotor blade bend-twist relationship on each of a multiple of rotor blades of the first rotor system and the second rotor system to maintain the minimum rotor separation between the first rotor system and the second rotor system.

9. A method as recited in claim 1, wherein said step (2) further comprising the step of:

limiting the minimum rotor blade tip separation to approximately 3 percent of a rotor diameter of the first rotor system.

10. A method of controlling a coaxial rotor system comprising the steps of:

(1) locating a first rotor system and a second rotor system along a common axis, the second rotor system spaced an axial distance from the first rotor system; and (2) independently controlling the first rotor system and the second rotor system with regard to pitch to maintain a minimum rotor blade tip separation between a rotor blade tip of the first rotor system and a rotor blade tip of the second rotor system and spacing the first rotor system and the second rotor system along the common axis an axial distance less than 10 percent of a rotor diameter of the first rotor system and the second rotor system.

11. A method as recited in claim 1, wherein said step (2) further comprising the step of:

adjusting the minimum rotor blade tip separation in response to an area of a flight envelope.

\* \* \* \* \*

UNITED STATES PATENT AND TRADEMARK OFFICE
CERTIFICATE OF CORRECTION

| | |
|---|---|
| PATENT NO. | : 7,083,142 B2 |
| APPLICATION NO. | : 10/830160 |
| DATED | : August 1, 2006 |
| INVENTOR(S) | : Mark Winfield Scott |

It is certified that error appears in the above-identified patent and that said Letters Patent is hereby corrected as shown below:

Title page Please insert Item (54)
(54) Title: COMPACT CO-AXIAL ROTOR SYSTEM FOR A ROTARY WING AIRCRAFT AND A CONTROL SYSTEM THEREFOR Signed and Sealed this Twenty-seventh Day of February, 2007

JON W. DUDAS
*Director of the United States Patent and Trademark Office*